# 3,061,555
STABILIZATION OF CATALYSTS OF MOLYBDENA-COBALT OXIDE ON ALUMINA HYDROGEL CARRIERS

Edwin H. McGrew, Riverside, and William P. Hettinger, Jr., Dolton, Ill., assignors to Nalco Chemical Company, a corporation of Delaware
No Drawing. Filed Dec. 15, 1958, Ser. No. 780,231
3 Claims. (Cl. 252—465)

This invention, in general, relates to the thermal stabilization of gamma-alumina carriers for catalytic materials. The invention is concerned with the stabilization of alumna in its usual amorphous or quasi-crystalline forms such as the gamma form under high temperature conditions wherein the alumina will ordinarily assume a less stable crystalline form, usually the alpha form.

Many catalysts consist of a catalytically-active compound or compounds which are supported upon a carrier. The use of supported catalysts may provide greater stability than would be the case of an unsupported catalyst. Also, the use of a carrier permits more advantageous use of more expensive catalytically-active components. The carriers and the resulting catalyst may be in pelleted or granular form suitable for use in fixed bed or moving bed operations or in finely-divided form, whereby they may be employed as a fluidized catalytic layer.

There are a large number of carriers which have been employed for supporting catalysts used in the refining of petroleum oils. Taking the case of cobalt molybdate, or combinations of cobalt oxide and molybdenum trioxide, which are active catalysts for hydrodesulfurization of liquid petroleum fractions, only high surface area carriers are used in preparing the best forms of cobalt molybdate or cobalt oxide-molybdenum trioxide hydrodesulfurization catalysts. In practice, gamma-alumina or gamma-alumina stabilized with a minor amount of silica have proven to be the most suitable carrier. Similarly, gamma-alumina is the preferred carrier for molybdenum oxide hydroforming catalysts. Normally, these catalysts function without difficulty in the hydrodesulfurization of liquid petroleum fractions. However, difficulties have been occasionally encountered when the catalyst is heated to temperatures in the order of 1550° F. and above in air. While the catalyst retains its hydrodesulfurization activity, it has been criticized due to its lack of sufficient high temperature steam or thermal stability because the catalyst particles lose their mechanical strength under these conditions. The loss of mechanical strength is believed to be attributable to the conversion of the gamma form of alumina to the alpha form at the aforementioned high temperatures. The conversion to the alpha form is accompanied by a loss in crushing strength of the catalyst particles.

The usual alumina carrier has the alumina essentially in the quasi-crystalline gamma form. Upon subjecting the alumina to heating, usually at temperatures in excess of 2000° F., the alumina is transformed into less stable crystalline forms—the transformation passing through one or more crystalline forms ultimately to the alpha form. Molybdena in the catalyst causes the gamma-alumina to transform to the alpha form at temperatures much below that at which the gamma-alumina is transformed in the absence of molybdena—temperatures in the range of 1500–1700° F. This phenomena occurs when molybdena is used alone or when it is employed in conjunction with cobalt oxide, and there is a stoichiometric excess of molybdena over cobalt oxide. A stoichiometric excess of molybdena occurs when there is an amount, calulated as $MoO_3$, in excess of 2.9 times the cobalt content, as CoO. The compound is assumed to be $Co_2Mo_3O_{11}$.

Based on studies, it is believed that molybdena combines or complexes with cobalt oxide on a stoichiometric basis of 2.9 parts molybdenum, as $MoO_3$, per one part cobalt, as CoO. The combined or complexed molybdena does not appear to cause any deleterious changes in the alumina structure. However, uncombined molybdena has a detrimental effect on the alumina by causing changes in the alumina hydrogel structure resulting in less mechanically stable catalyst particles in accordance with the observations previously described.

We have discovered one way to stabilize the alumina structure against deleterious changes in the presence of "excess" molybdena at temperatures in the range of 1500–1700° F. This is achieved by providing in the catalyst carrier an alkaline earth oxide, either calcium oxide or magnesium oxide, in an amount at least equal to and preferably greater than the stoichiometric equivalent to the "uncombined or uncomplexed" molybdena. On a weight basis, the stoichiometric ratio between calcium and molybdenum is 3.9 parts molybdenum, as $MoO_3$, per part calcium, as CaO, and 5.4 parts molybdenum, as $MoO_3$, per part magnesium, as MgO. In other terms, the catalyst compositions contemplated by our invention are molybdate catalysts on alumina carriers containing sufficient calcium oxide and/or magnesium oxide to provide at least a stoichiometric total with cobalt oxide equivalent to the amount of molybdenum, as $MoO_3$, in the catalyst.

An object of our invention is to provide improvements in the mechanical stabilization of catalysts which utilize gamma-alumina as a carrier.

A still further object of the invention is to provide catalysts having improved mechanical strength when subjected to high temperatures.

As stated heretofore, these and other objects of the invention may be attained by the incorporation into the alumina of a small amount of calcium and/or magnesium oxide. The addition of the alkaline earth oxide is preferably achieved by coprecipitation of the oxide with the catalyst precursor alumina. This procedure involves the addition of a water-soluble alkaline earth salt such as $CaCl_2$ or $MgCl_2$ to the aluminum salt solution prior to its precipitation as alumina. However, the alkaline earth salt may also be added to the alumina as a solution after the washing of the alumina and/or during impregnation of the alumina with the active molybdena or cobalt-molybdena ingredients. In the ultimate catalyst, no loss in activity has been apparent due to the incorporation of the alkaline earth stabilizer. The oxides stabilize gamma-alumina carriers of molybdenum oxide-alumina type hydroforming catalysts and cobalt molybdate or cobalt oxide-molybdena hydrodesulfurization catalysts. The alumina carriers may be prepared in either microspherical, extruded or tabletted form for use in desulfurization, hydroforming and hydrocracking catalysts.

The term "hydrodesulfurization" refers to a process in which sulfur and other undesirable compounds are removed from a wide variety of products, such as gasoline, kerosene, lubricating oil stock, fuel oils, catalytic cracking feed stocks and even straight crude petroleum oils, by passing the raw stock over a catalyst which is preferably a fixed bed catalyst, at temperatures around 450° F. to 850° F. and pressures of 100 to 1000 p.s.i.g., with the addition of hydrogen preferably in amounts of 200 to 2500 cubic feet per barrel. This process is usually operated at the highest temperature possible without coking. The higher the partial pressure of hydrogen, the less likely the tendency to coke. The hydrogen is circulated and the sulfur in the hydrocarbons is largely removed as hydrogen sulfide.

In general, the alkaline earth content, expressed as the oxide (CaO or MgO) of the alumina carrier will be within the range of 0.1–5% by weight. In all instances, the
}

CaO or MgO content should be at least equal to and preferably in excess of the stoichiometric quantity equal to the molybdena content of the catalyst—taking into account any cobalt present. The hydrodesulfurization catalysts, based on the total weight of the catalyst, may have 2–20% cobalt molybdate or combinations of the cobalt oxide and molybdena, wherein the cobalt content is in the range of 1–10% and the molybdena content in the range of 3–20%.

While the hydrogel carriers of alumina or alumina and silica, together with the alkaline earth oxides, may be prepared by any of several techniques involving the precipitation of alumina, the following is an outline of a preferred method for forming the hydrogel. The alkaline earth oxide may be incorporated into the catalyst hydrogel at one of the points outlined supra. An aqueous solution of sodium aluminate is prepared.

An acidic reagent is added to precipitate the alumina in hydrous form from the alkaline aqueous aluminate solution and this reagent is preferably an acidic aluminum salt, for example, aluminum sulfate. Aluminum chloride and other aluminum salts of acids whose anions form alkali soluble salts with aluminum, and the free acids themselves, can be used as the acidic reagents to bring about the precipitation of the alumina but aluminum sulfate is preferred because of the excellent results obtained by its use and its low cost and ready availability. Aluminum chloride is more expensive and more difficult to handle. The free acids are less expensive but present problems due to localized action. If free acids are used they should be diluted and added to the alkaline aluminate solution under controlled conditions. The alumina are precipitated from an alkaline aqueous solution at a pH between about 8 and 12 and preferably between 9 and 10.5.

The concentrations of the reactants employed are controlled and the concentration of alumina in the final slurry, is preferably within the range of 1% to 2.5% by weight as $Al_2O_3$. The concentrations of alumina can be as high as 5% or 6% by weight, as $Al_2O_3$, in the final slurry. A general range of concentration of alumina is from about 0.8% to about 6%, calculated as $Al_2O_3$. Good results have been obtained by adding the acidic reagent, for example, an aluminum sulfate solution, either simultaneously or in increments.

The temperature of the reaction mixture during the precipitation of the alumina is an important factor but can vary rather widely from temperatures just above the freezing point of water to temperatures just below the boiling point of water. Good results have been obtained at temperatures within the range of 40° F. to 140° F., provided certain precautions are observed. If temperatures in the upper part of the temperature range, say above about 95° F., are used, the pH should also be relatively high in order to precipitate alumina having desirable physical characteristics for fluidized catalysts. One difficulty which is encountered under these operating conditions at a high pH is that the high pH interferes with mechanical operations such as filtration because highly alkaline solutions are very difficult to handle, especially when hot, and tend to destroy or impair filter cloths. This also makes it necessary to use special types of equipment. However, by carrying out the precipitation of the alumina in the presence of an aldonate which is usually added initially as an aldonic acid, it is possible to effect the precipitation and produce alumina or alumina-silica particles in hydrous gel form at a lower pH than is possible without the addition of the aldonic acid or aldonate. Furthermore, it is possible to carry out the process at elevated temperatures which would not be practical with higher pH's. Thus, the precipitation of the alumina in hydrous gel form at temperatures in excess of about 95° F., preferably around 110° F. to 140° F., at a final pH within the range of 9 to 10.5, can be effected with the addition of an aldonic acid or an aldonate, whereas, under corresponding conditions without the addition of the aldonic acid or aldonate a chalky precipitate is obtained rather than a glassy gel. The use of the higher temperatures has the further advantage that the gels made at the higher temperatures have increased surface area and increased pore volume as compared with products made at lower temperatures. Aldonic acids employed for this purpose can be obtained by the oxidation of an aldose or in any other suitable manner. Gluconic acid is preferably used because it is readily available in the form of an aqueous solution having a concentration of about 50% by weight of gluconic acid. When the gluconic acid is added to an alkaline aluminate solution it is converted to the corresponding alkaline gluconate and, if desired, the gluconate may be added initially instead of the acid. Other examples of aldonic acids and salts thereof which may be used are galactonic, arobonic, xylonic and mannonic. The aldonic acids exist in several forms and the invention contemplates the use of one or more of these forms or mixtures thereof including the lactone forms, for example, the gamma lactone form of gluconic acid. Commercial gluconic acid usually contains about 1% glucose. Other examples of suitable aldonates are the potassium, zinc, magnesium, calcium and lithium salts of gluconic acid or other aldonic acids. If an aldonate is used it should be soluble in the reaction medium in the proportions in which it is used. The preferred proportions of aldonic acid or aldonate are within the range of about 0.5% to 6.0% by weight, calculated as gluconic acid, on the weight of $Al_2O_3$ and excellent results have been obtained with proportions in the range of about 2% to 3% of the aldonate, calculated as gluconic acid on the weight of $Al_2O_3$. The aldonic acid can also be used to the acidic reagent used in precipitating the alumina.

After the precipitation of the synthetic alumina, the slurry is preferably filtered to increase the concentration of solids to 4% to 7% by weight, as $Al_2O_3$. This filtration step is optional but is particularly important where it is desirable to produce microspheres having a particle size within the range of 20 to 100 microns which is a desirable particle size for fluidized catalysts. The filtering step also effects a substantial purification by the removal of soluble salts.

If the precipitation of the alumina has been effected at a low temperature and it is desired to filter the resultant slurry before drying, it is preferable to heat the slurry to a temperature within the range of 100° F. to 150° F., preferably around 120° F. as an aid to filtration. However this is optional.

The filtered catalyst composition can be used as such for some purposes but is preferably reslurried with enough water to produce a pumpable mixture and then spray-dried. In general, the concentration of the slurry to be spray-dried should be at least 3.5% by weight of solids and preferably within the range of 4% to 7% by weight of solids. The spray-drying temperature can vary rather widely, depending upon the product desired but is usually within the range of 200° F. to 2000° F. The temperature used will depend on such factors as the quantity of material to be dried and the quantity of air used in the drying. The evaporation rate will vary depending upon the quantity of air used in the drying. The temperature of the particles which are being dried is preferably within the range of 150° F. to 300° F. at the completion of the drying. A maximum particle temperature of 300° F. is desirable in order to avoid temperatures that would cause conversion of one form of aluminum to another. At approximately 400° F. the aluminum trihydrate is converted to the monohydrate. For some purposes, of course, the latter form of alumina may be desirable and in such event the drying can be effected under conditions sufficient to produce a temperature higher than 300° F. in the final dried particles. The drying is preferably effected by a process in which the particles to be dried and a hot air stream are moving in the same direction for the entire drying period. This is usually referred to as concurrent drying as distinguished from countercurrent drying, or drying of the type carried out in a cyclone apparatus. Concurrent drying has the advantage for the present invention that it gives large particles an opportunity to dry before they can adhere to the walls of the drier or to other particles.

The alumina microspheres can, if desired, be treated in conventional ways to remove alkali metal ions and sulfate ions. They are then passed into a flash drier to remove excess moisture until the total volatile content is below about 20% by weight.

A preferred procedure for preparing an alumina base suitable as a catalyst carrier is illustrated in the following example, but the invention is not limited thereto. The parts are by weight unless otherwise specified.

EXAMPLE I

In a suitable tank or vessel having a stirring apparatus, 408 parts of soda ash are dissolved in 68,000 parts of water. To the soda ash solution is added 2,520 parts of an aqueous sodium aluminate solution containing 590 parts of sodium aluminate, expressed as $Al_2O_3$. The water temperature was approximately 80° F.

A separate solution was prepared, dissolving in 19,150 parts of water at 80° F. an amount of alum equivalent to 552 parts $Al_2O_3$ and thereafter an amount of calcium chloride in an amount equivalent to provide 1.5% CaO in the catalyst. The alum-calcium chloride solution was added to the soda ash-sodium aluminate solution over a period of 90 minutes with stirring. The final pH was approximately 5.2.

Then a solution of 120 parts of sodium aluminate expressed as $Al_2O_3$, and 2,450 parts of water was added in a period of 5 minutes to adjust the pH of the slurry to 8.5. The slurry was then filtered without heating and spray-dried in an air stream at approximately 300° F. The resulting spray-dried aluminum microspheres were washed with water by mixing them with water, and the water was removed by filtration.

To prepare a desulfurization catalyst, 3,690 grams of the moist filter cake from the washing operation, containing 890 grams of alumina base, was slurried in one gallon of water and heated to 200° F. A slurry of 139 grams of molybdenum trioxide in 300 milliliters of water was added to the alumina slurry and allowed to react for 20 minutes at 200° F. Then a slurry of 76.4 grams of cobalt carbonate equivalent to 42.8 grams of cobalt oxide, in 150 milliliters of water was added to the alumina slurry. The mixture was allowed to react at 200° F. for two hours.

The excess solution was separated by filtration and the filter cake was dried at 200° F. for six hours. A portion of the dry powder was moistened to a moisture content of approximately 48% and the moistened product was extruded as extrudates of 1/8% and 1/16% diameters. Another portion of the dry powder was tabletted into pills of approximately 3/16" diameter.

The effectiveness of the calcium oxide in the stabilization of the gamma-alumina against change to the alpha form was determined by calcining the extrudates and pills, which contained approximately 1.5% CaO, at 1,550° F. for 16 hours. A similar product, containing no stabilizing additive, was run as a control. X-ray defraction patterns for the control gave strong lines for alpha form and weak lines for the gamma form, whereas the calcium oxide containing extrudates and pills all showed strong gamma lines.

In further evaluations of the catalyst, comparisons were made between the surface area, pore volume and pore diameter of the catalyst bases before heat treatment or calcination thereof, after calcination for 16 hours at 1,500° F. Also, the surface area, pore volume and pore diameter was determined for the cobalt-molybdenum impregnated catalyst before heat treatment and after calcination at 1550° F. for 18 hours. The results of these determinations are reported in the following table.

Table I

|  | Control | 1/8" Extrudate | 3/16" Pellets |
|---|---|---|---|
| Alumina Base: |  |  |  |
| Surface area, m.²/g | 240 | 336 | 336 |
| Pore volume, cc./g | 0.47 | 0.43 | 0.43 |
| Pore diameter, A | 81 | 52 | 52 |
| Calcined Alumina Base: |  |  |  |
| Surface area, m.²/g | ---- | 210 | 210 |
| Pore volume, cc./g | ---- | 0.69 | 0.69 |
| Pore diameter, A | ---- | 139 | 134 |
| Cobalt-Molybdena Catalyst: |  |  |  |
| Surface area, m.²/g | 286 | 260 | 254 |
| Pore volume, cc./g | 0.47 | 0.47 | 0.47 |
| Pore diameter, A | 66 | 72 | 72 |
| Calcined Cobalt-Molybdena Catalyst: |  |  |  |
| Surface area, m.²/g | 34 | 35 | 35 |
| Pore volume, cc./g | 0.07 | 0.33 | 0.33 |
| Pore diameter, A | 80 | 379 | 379 |

It is concluded from the foregoing results and the X-ray defraction determinations that calcium oxide stabilizes the gamma form of alumina when the latter is subjected to severe heating. Surface area and port volume are stabilized, by the presence of the calcium oxide. Also, the virgin hydrodesulfurization activities of calcium oxide-stabilized catalysts were better than average. For example, the relative activity of the 1/8" extrudates was as follows: volume activity, 140 and weight activity 169. Crush strength of the pellets both after steaming 16 hours at 1550° F. and calcining for 16 hours at 1550° F. was considerably better than the control.

The hydrodesulfurization tests were carried out at 700° F. at 450 p.s.i.g. on a West Texas sour crude oil feed stock containing 1.77% sulfur and having an API gravity at 60° F. of 24.0. The feed rate, the volume of feed stock per hour per volume of catalyst, was 4, and the hydrogen feed rate was 3500 cubic feet per barrel of feed. The relative activities are determined by a ratio comparison with the results obtained under the same conditions with a standard catalyst, whose activity is assigned the value of 100.

EXAMPLE II

An alumina catalyst prepared in accordance with Example I but without $CaCl_2$ addition was dried for 8 hours at 240° F., and the alumina hydrogel base was impregnated by immersion of 100 g. of the catalyst in 110 ml. of an aqueous solution containing 3.0 g. of $CaCl_2$ for a period of about 20 minutes. The excess solution, amounting to about 55 ml., was decanted. The catalyst was pre-dried for one hour at 200° F. and then dried for 6 hours at 1150° F. No alpha alumina was observed in the calcium oxide containing catalyst after thermal treatment at 1550° F. In the control catalyst (no calcium oxide) alpha alumina was present after thermal treatment.

EXAMPLE III

A catalyst was prepared according to the procedure of Example I to provide a cobalt oxide-molybdena catalyst on an alumina carrier containing 0.49% by weight of calcium as CaO and 0.27% of magnesium as MgO. The pill strength of this catalyst after calcining at 1550° F. and also steaming at 1550° F. was considerably better than the catalyst prepared without calcium and magnesium addition.

To summarize, the instant invention is broadly applicable to the stabilization of alumina in the gamma form, and articles of manufacture wherein the alumina intentionally or accidentally is subjected to high temperatures on the order of 1500° F. and above. The invention has particular application in the manufacture of alumina base catalyst containing molybdates as catalysts for the processing of petroleum oils. By stabilization against change of the gamma form of the alumina to the alpha form under high temperature conditions, the invention avoids losses in mechanical strength of the catalyst particles which result from conversion from the gamma form of alumina to crystalline forms of lesser mechanical strength.

The invention is hereby claimed as follows:

1. A hydrodesulfurization catalyst consisting essentially of cobalt oxide and molybdena on a gamma alumina hydrogel carrier wherein the weight ratio of molybdena to cobalt oxide exceeds 2.9:1, said carrier containing an alkaline earth oxide selected from the group consisting of calcium oxide, magnesium oxide, and mixtures thereof in an amount in the range of 0.1–5% by weight of said carrier and at least stoichiometrically equal to the excess molybdena above said ratio.

2. A hydrodesulfurization catalyst consisting essentially of cobalt oxide and molybdena on a gamma alumina hydrogel carrier wherein the weight ratio of molybdena to cobalt oxide exceeds 2.9:1, said carrier containing 0.1–5% calcium oxide on a weight basis and at least equal to one part of calcium, expressed as CaO, per 3.9 parts of the molybdenum, expressed as $MoO_3$, which constitutes the excess molybdena over said ratio.

3. A hydrodesulfurization catalyst consisting essentially of cobalt oxide and molybdena on a gamma alumina hydrogel carrier wherein the weight ratio of molybdena to cobalt oxide exceeds 2.9:1, said carrier containing 0.1–5% magnesium oxide on a weight basis and at least equal to one part of magnesium, expressed as MgO, per 5.4 parts of the molybdenum, expressed as MoO3, which constitutes the excess molybdena over said ratio.

References Cited in the file of this patent

UNITED STATES PATENTS

| | | |
|---|---|---|
| 2,371,088 | Webb | Mar. 6, 1945 |
| 2,422,172 | Smith | June 10, 1947 |
| 2,422,372 | Smith | June 17, 1947 |
| 2,692,293 | Heinemann | Oct. 19, 1954 |
| 2,692,846 | Oblad et al. | Oct. 26, 1954 |
| 2,799,661 | De Rosset | July 16, 1957 |

FOREIGN PATENTS

| | | |
|---|---|---|
| 533,525 | Canada | Nov. 20, 1956 |